U S009163780B2

United States Patent
McDonald

(10) Patent No.: US 9,163,780 B2
(45) Date of Patent: Oct. 20, 2015

(54) JOIST STORAGE SYSTEM

(71) Applicant: RAFTER PACKER LLC, St. Charles, MO (US)

(72) Inventor: Timothy McDonald, O'Fallon, MO (US)

(*) Notice: Subject to any disclaimer, the term of this patent is extended or adjusted under 35 U.S.C. 154(b) by 0 days.

(21) Appl. No.: 13/710,429

(22) Filed: Dec. 10, 2012

(65) Prior Publication Data

US 2013/0146730 A1 Jun. 13, 2013

Related U.S. Application Data

(60) Provisional application No. 61/630,327, filed on Dec. 9, 2011.

(51) Int. Cl.

| F16M 13/02 | (2006.01) |
|---|---|
| A47B 96/00 | (2006.01) |
| B65D 25/28 | (2006.01) |
| A47G 25/02 | (2006.01) |
| A47F 3/14 | (2006.01) |
| A47B 97/00 | (2006.01) |
| A47B 96/06 | (2006.01) |
| A47B 55/02 | (2006.01) |

(52) U.S. Cl.
CPC ............... *F16M 13/02* (2013.01); *A47B 97/00* (2013.01); *A47F 3/147* (2013.01); *A47G 25/02* (2013.01); *B65D 25/2879* (2013.01); *A47B 55/02* (2013.01); *A47B 96/06* (2013.01)

(58) Field of Classification Search
CPC ........ A47B 96/06; A47B 96/024; A47B 5/00; A47B 55/02; A47B 96/025; A47F 3/147; B65D 25/2879; B65D 2525/287; F16M 13/02; A47G 25/02
USPC ........... 248/317, 200.1, 201, 240.1, 264, 368, 248/243, 244, 322, 333, 343, 327, 318, 301, 248/302, 303; 211/181.11, 126.15, 117, 211/119, 175, 90.03, 187, 186, 133.1; 108/147.16, 147.17; 220/491; D8/349, D8/354, 373
See application file for complete search history.

(56) References Cited

U.S. PATENT DOCUMENTS

| 2,213,937 | A | * | 9/1940 | Tompkins et al. | ............... 248/99 |
| 4,422,556 | A | * | 12/1983 | Moore | .......... 211/119 |
| 4,666,117 | A | * | 5/1987 | Taft | .............. 248/243 |
| 5,086,936 | A | * | 2/1992 | Remmers | ............ 211/126.15 |
| 5,087,008 | A | * | 2/1992 | Miller et al. | ............ 248/311.2 |
| 6,341,704 | B1 | * | 1/2002 | Michel, Jr. | ............ 211/181.1 |
| 6,612,529 | B2 | * | 9/2003 | Snyder | .......... 248/301 |
| 7,575,213 | B2 | * | 8/2009 | Rausch | .......... 248/317 |
| 2007/0187561 | A1 | * | 8/2007 | Xayoiphonh | ............ 248/235 |

* cited by examiner

*Primary Examiner* — Tan Le
(74) *Attorney, Agent, or Firm* — Polster, Lieder, Woodruff & Lucchesi, L.C.

(57) ABSTRACT

A joist storage system with a pair of hangers mounted to adjacent joists. The hangers are configured to removeably receive and support a storage container with the channel between the joists.

3 Claims, 3 Drawing Sheets

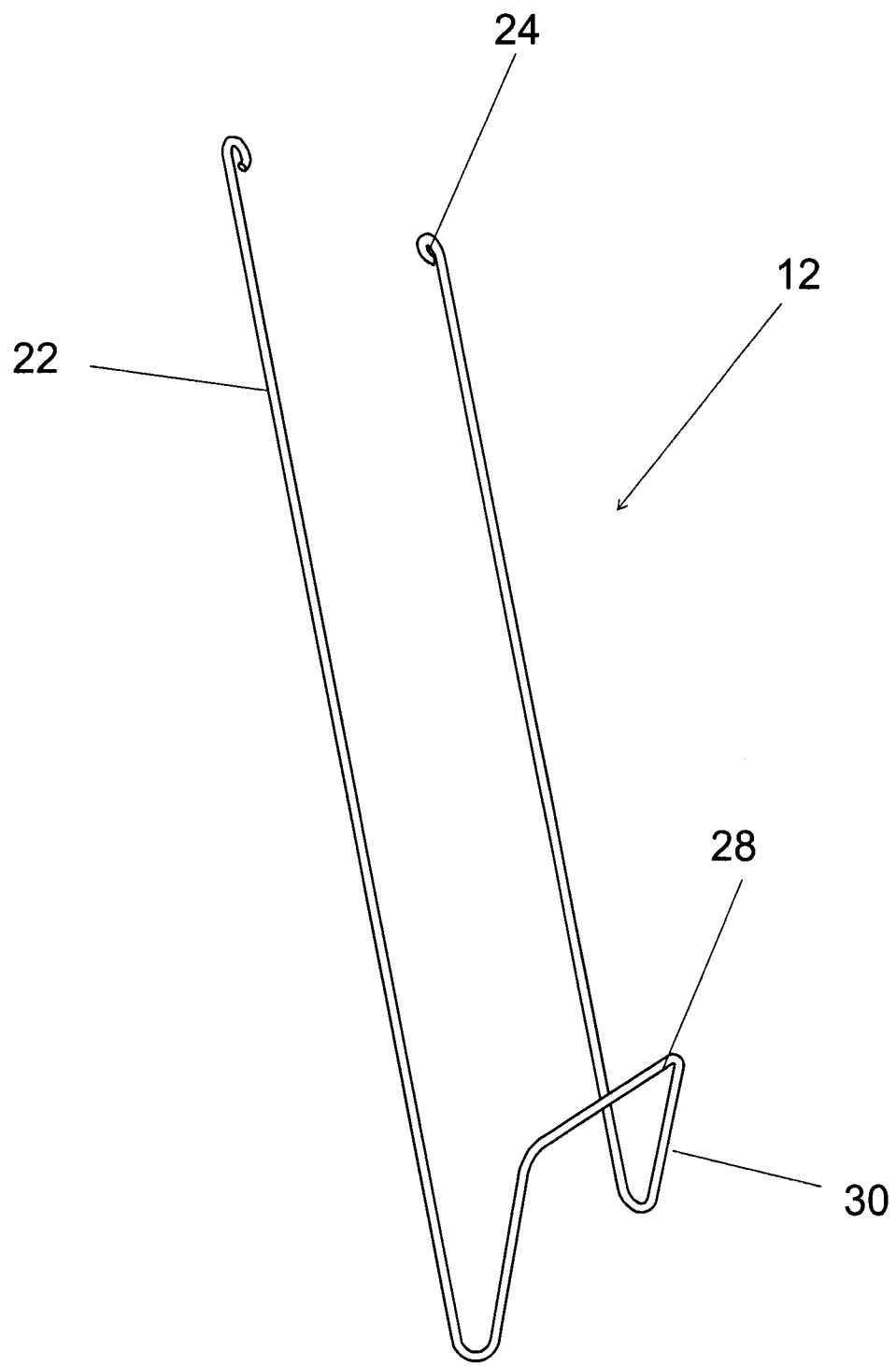
F I G . 1

JOIST STORAGE SYSTEM

CROSS-REFERENCE TO RELATED APPLICATIONS

This Non-Provisional application claims priority to U.S. Provisional Application Ser. No. 61/630,327 filed Dec. 9, 2011, and which is incorporated herein by reference.

STATEMENT REGARDING FEDERALLY SPONSORED RESEARCH

Not Applicable.

BACKGROUND

In most residential homes, storage space is limited. Once the closet space is used up, homeowners began utilizing other spaces of the house, including, the garage, the attic, the basement, extra bedrooms, or crawl space. These spaces can be modified for better storage to include shelves or other organizational systems. However, many conventional systems do not provide for convenient access to the stored items or are not cost effective. In addition, conventional systems do not utilize available spaces, such as the channels between joists.

What is needed is a cost effective, convenient storage system that utilizes the channels between joists.

DESCRIPTION OF THE DRAWINGS

In the accompanying drawings which form part of the specification:

FIG. 1 is a perspective view of a hanger of a joist storage system;

Corresponding reference numerals indicate corresponding parts throughout the several figures of the drawings.

DETAILED DESCRIPTION

Figure 2:
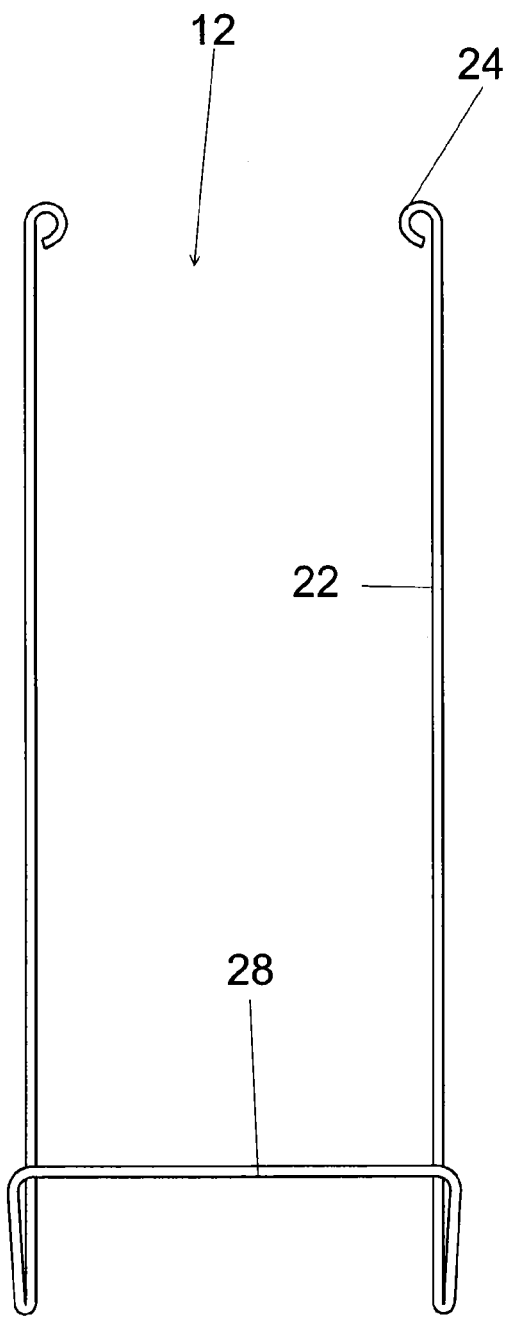
FIG. 2 is a front view of the hanger.

The following detailed description illustrates the claimed invention by way of example and not by way of limitation. The description clearly enables one skilled in the art to make and use the claimed invention, describes several embodiments, adaptations, variations, alternatives, and uses of the claimed invention, including what is presently believed to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

As shown in FIGS. 1-6, a joist storage system 10, includes a pair of hangers 12 mounted to respective joists 14 and adapted to removeably receive and support a storage container 16.

Figure 4:
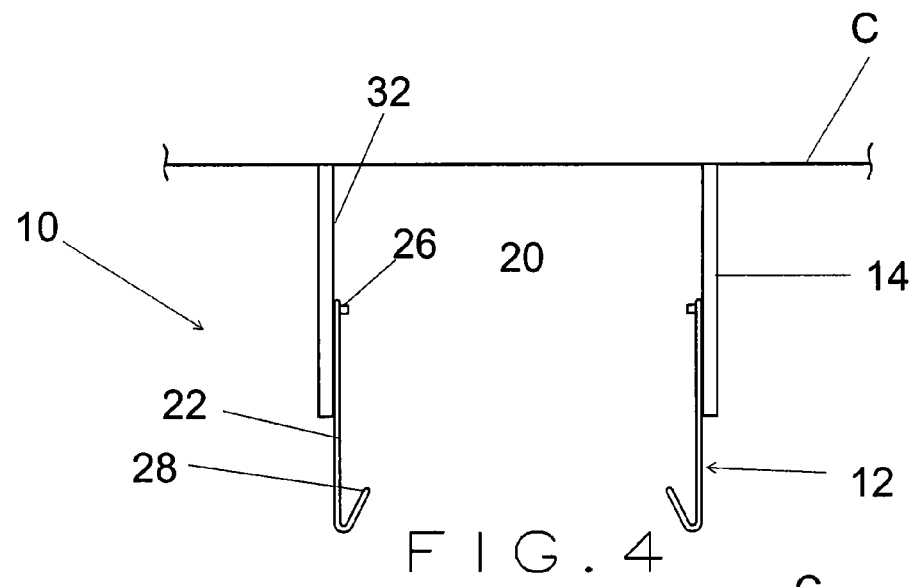
FIG. 4 is a partial cross-section end view of joists with a pair of hangers mounted in a support position.
Figure 5:
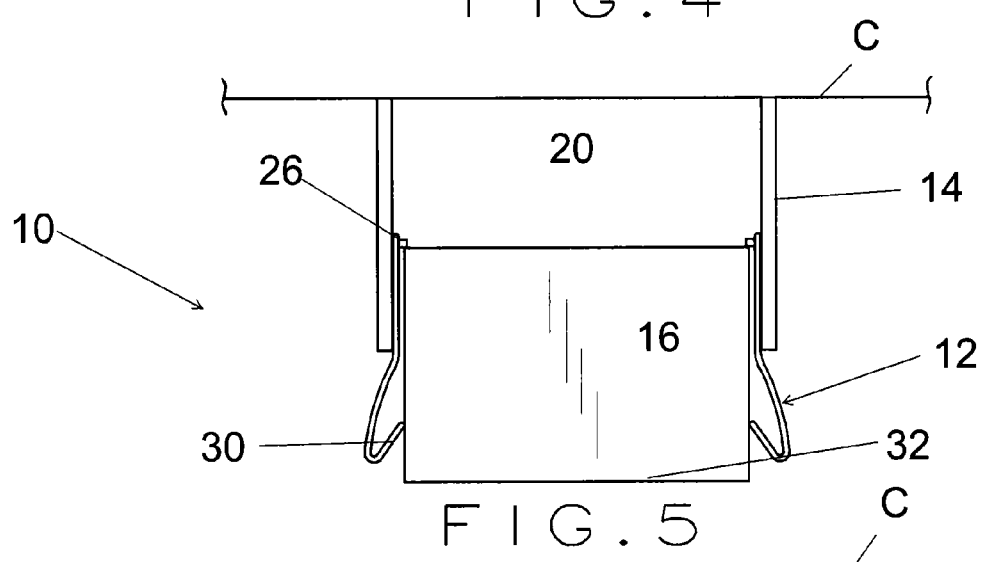
FIG. 5 is a partial cross-section end view of joists with the pair of hangers in a retracted position for receiving a storage container.
Figure 6:
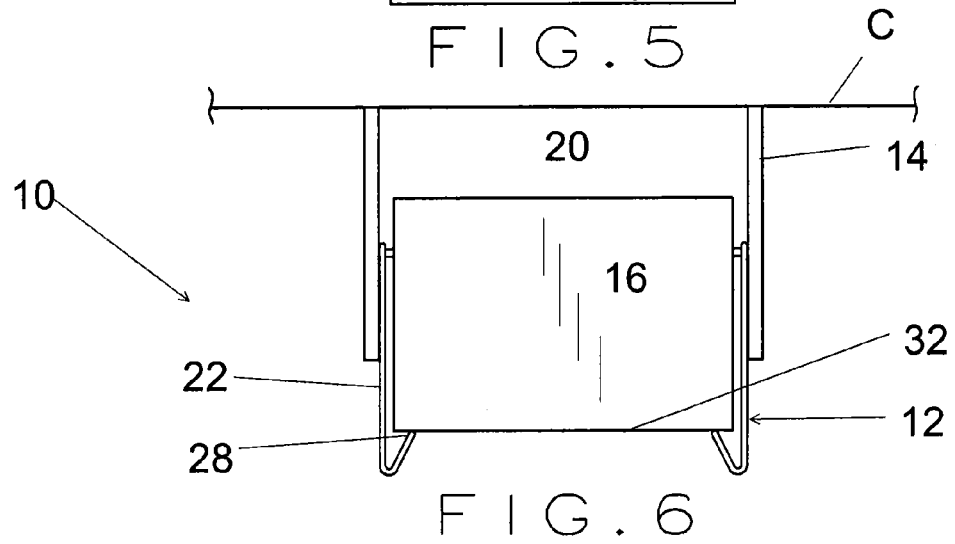
FIG. 6 is a partial cross-section end view of joists with the pair of hangers in a support position and supporting the storage container.

FIGS. 4-6 show an end view of a partial cross-section of joists 14 supporting a ceiling C. Each joist 14 is configured for providing adequate support for the ceiling C, which is typically dictated by building codes. The size, span, and spacing of the joists 14 are determined according to a number of factors, including, but not limited to, load, type of material, and joist dimensions. Generally, dimensions and spacing of the joists 14 are selected from a set of standard sizes. Standard dimensions include (in inches): 2×6, 2×8, 2×10, and 2×12. Standard spacing between joists 14 include (in inches): 12", 16", 19.2", and 24". The dimensions and spacing of the joists 14 determined the size of the channel 20 between the joists 14. Each joist 14 is preferably made from suitable material, including, but not limited to, wood, engineered wood, plywood, steel, or concrete.

Figure 3:
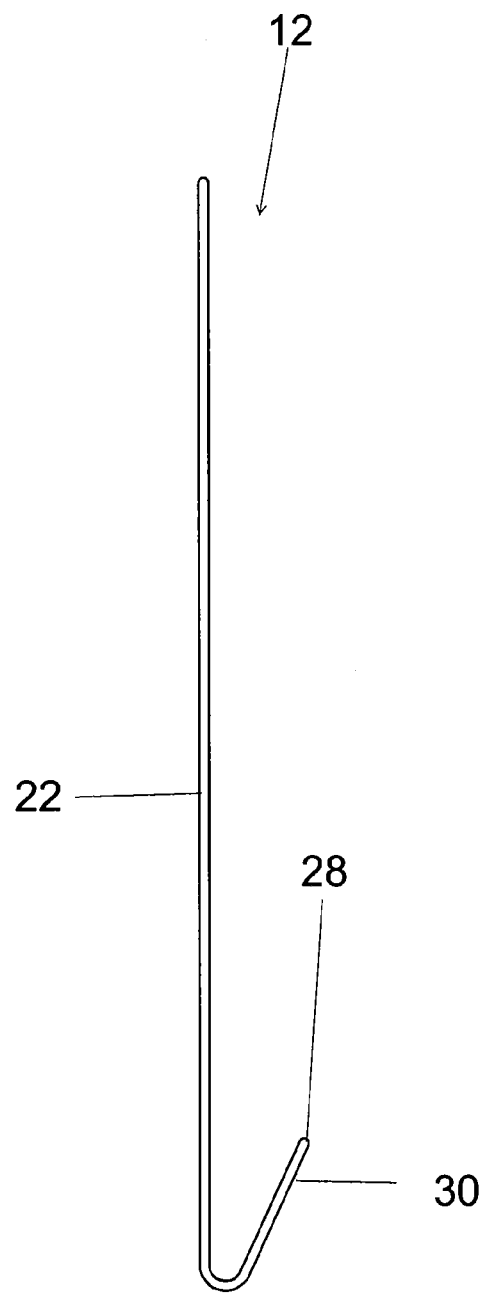
FIG. 3 is a side view of the hanger.

Each hanger 12 includes a pair of arms 22 with a distal end terminating in an attachment member 24 for mounting to the joist 14 (FIGS. 1-3). Preferably the attachment member 24 is a loop, or eye, configured for receiving fasteners 26, such as nails or screws. However, the attachment member 24 can comprise any device suitable for mounting the hanger 12 to the joist 14, such as, adhesive or welding. The opposite ends of the arms 22 connect to a support member 28, which extends upwardly relative to the arms 22 preferably at an angle of about 45°, although, any suitable angle can be used. The hanger 12 is made from a material, such as steel, tempered aluminum, brass, plastic, or wood, that permits the arms 22 to flex between a support position with the arms extended generally downward, and a retracted position with at least a portion of the arms bent generally outwardly. Also, the hanger 12 should be strong enough to support the storage container 16 and its contents, such as a weight of about 30-50 lbs. The arms 22 are preferably about 10" inches in length, but any length can be used.

Preferably, the hanger 12 is made from a unitary metal wire, such as a metal wire standard gauge 11, or 0.116 in. diameter. However, other materials and sizes can also be used, including, not limited to, plastic, wood, or composite materials. In addition, the hanger 12 can be made from multiple pieces of material connected together to form the final arrangement.

The storage container 16 is a generally rectangular box (FIGS. 4-6). Generally, the dimensions of the storage container are determined and generally correspond to the height and spacing between the joists 14. The container 14 can be made from any suitable material, including, but not limited to, cardboard, plastic, metal, or composite material. Labels are placed onto the bottom surface the storage container 16 to identify the contents. In an alternate embodiment, the container has a removeable lid.

In operation, the hangers 12 are mounted to opposing sidewalls 32 of adjacent joists 14 (FIG. 4). Each hanger 14 is positioned generally across from the other hanger 14 at the generally same elevation, with the support member 28 facing inwardly. To mount each hanger 14, fasteners, such as nails, are inserted through the attachment device and into the joist 14. The hangers 14 are mounted at an elevation that allows the storage container 16 to reside in the channel 20 between the support member 28 and the ceiling F.

The storage container 16 is filled with selected contents. The user pushes the storage container 16 upwardly until the top edges contact the lower angled surface 30 of the support member 28. As the storage container 16 moves upwardly, the hanger 12 moves from the support position to the retracted position (FIG. 5). In the retracted position, the storage container 16 can continue to move upwardly with the support members 28 sliding along the sides of the storage container 16. When the bottom 32 of the storage container 16 moves above the support member 16, the hanger 12 returns to the support position. The storage container 16 is lowered until it rests on the support members 28 of the hangers 12 (FIG. 6). To remove the storage container 16, the user moves the hangers from the support position to the retracted position and lowers the storage container 16 (FIG. 5).

Changes can be made in the above constructions without departing from the scope of the invention. It is intended that all matter contained in the above description or shown in the accompanying drawings shall be interpreted as illustrative and not in a limiting sense.

What is claimed is:

1. A joist support system, comprising:
    a storage container; and
    a pair of hangers configured for attachment in opposed relation to each other to a pair of joists, thereby defining a channel therebetween; the hangers being configured for movement between a retracted position, where a lower portion of each hanger is bent outwardly, for receiving and removing the storage container, and a support position for supporting a lower surface of the storage container within the channel; and
    wherein each hanger includes a pair of arms, an attachment member attached to each arm; and a support member attached to the pair of arms, the support member having a pair of legs extending generally upward from the lower portion of respective arms, and a crossbar extending between the legs.

2. A method for storing a container between adjacent joists, comprising the steps of:
    providing a storage container;
    mounting a pair of hangers in opposed relation to each other to a pair of joists;
    moving each hanger from a support position to a retracted position, where a lower portion of each hanger is bent outwardly;
    moving the storage container into a channel between the joists; and
    resting the storage container on the support members of the pair of hangers.

3. A pair of hangers for support of a container, each hanger, comprising:
    a pair of generally vertical arms;
    an attachment member attached to each arm, configured for attachment to a joist;
    a support member extending between a lower portion of the pair of arms, the support member being configured for supporting the storage container; and
    wherein the support member is configured for movement between a retracted position for receiving and removing the storage container, and a support position for supporting a lower surface of the storage container; the support member comprising a pair of legs extending generally upward from the lower portion of respective arms, and a crossbar extending between the legs.

* * * * *